United States Patent [19]

Schrader

[11] Patent Number: 4,870,775

[45] Date of Patent: Oct. 3, 1989

[54] DIRECTIONAL REVERSING LURE

[76] Inventor: Henry Schrader, P.O. Box 93, State Line, Miss. 39362

[21] Appl. No.: 97,686

[22] Filed: Sep. 17, 1987

[51] Int. Cl.⁴ .................................... A01K 85/00
[52] U.S. Cl. .......................... 43/42.02; 43/42.24; 43/42.3
[58] Field of Search .............. 43/42.02, 42.24, 42.3, 43/42.28

[56] References Cited

U.S. PATENT DOCUMENTS

| | | | |
|---|---|---|---|
| 1,881,947 | 10/1932 | Rawdon | 43/42.3 |
| 2,083,513 | 6/1937 | Burge | 43/42.3 |
| 3,100,360 | 8/1963 | Creme | 43/42.02 |
| 3,158,952 | 12/1964 | Creme | 43/42.24 |
| 3,349,513 | 10/1967 | Jeff | 43/42.24 |
| 4,047,318 | 9/1977 | Mapp | 43/42.24 |
| 4,619,069 | 10/1986 | Strickland | 43/42.26 |

FOREIGN PATENT DOCUMENTS 2327727  5/1977  France ......................... 43/42.3

Primary Examiner—Gene P. Crosby
Attorney, Agent, or Firm—Gregory M. Friedlander

[57] ABSTRACT

The invention relates to a lure made in part of resilient flexible material which forms a connection between a front portion which attaches to a fishing line and at least one paddle designed to create a drag against the water in which the lure moves. The resilient, flexible material is of sufficient resiliency or elasticity and thickness so that when the lure is pulled through the water the paddles are deflected back against the pressure of the water and the paddles return to their original shape and position relative to the body when the tension on the line is released. The paddles are sufficiently wide so that when the tension is released, and the paddles return to their resting position, the lure is moved backward by the force of the paddles moving back to the resting position.

15 Claims, 1 Drawing Sheet

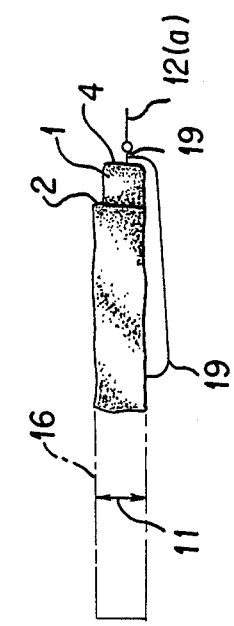
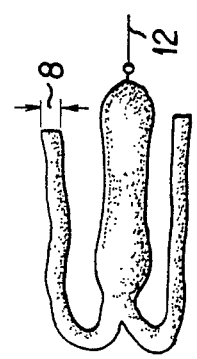
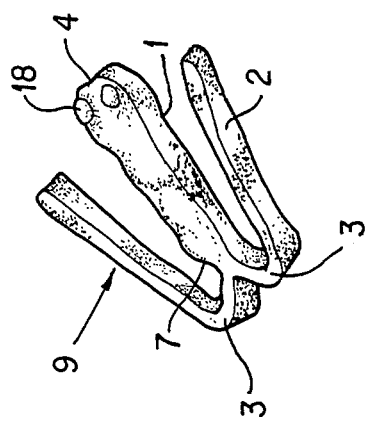
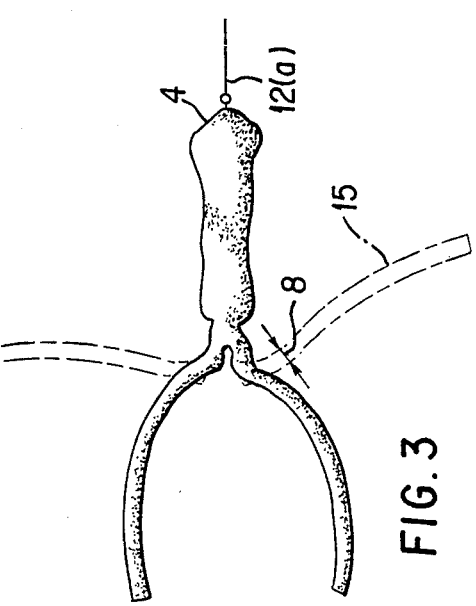
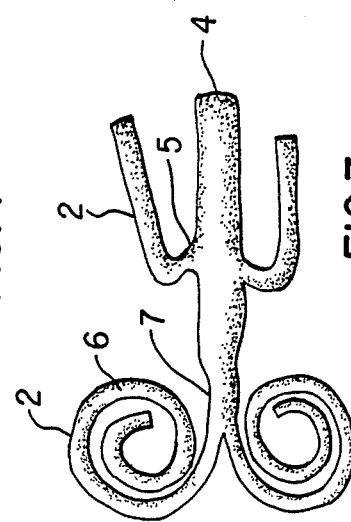
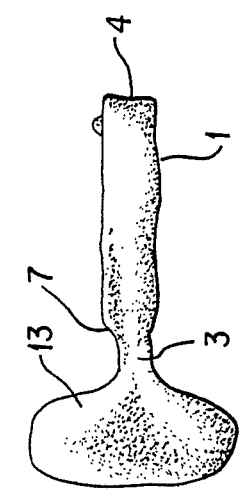
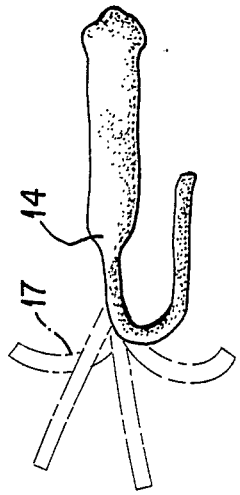

DIRECTIONAL REVERSING LURE

BACKGROUND OF INVENTION

1. Field of Invention

The present invention relates to a Fishing lure.

The invention relates to flexible fishing lures. More specifically, the invention relates to a flexible fishing lure with at least one paddle attached to the main body of the lure by way of a connection which is sufficiently flexible so that the paddle(s) moves backwards as the lure is moved forward through the water but sufficiently resilient to (1) maintain a shape resistant to the water and (2) return to the original position the paddle(s) holds relative to the body when the lure is at rest with sufficient force against the water to move the lure body and trailing line backwards.

2. Prior Art

Many fishing lures exist utilizing flexible joints. Many of the flexible lures in these cases are designed to import some movement or lifelike quality to the lure in question:

Prior art (fishing lures) utilized elastic construction in order to give the lure a life-like texture and to provide for flexible members to attract fish.

3. General Discussion of the Invention

The present invention utilizes elastic materials in order to propel the entire lure backwards through the water. Specifically, the lure mimics the movement of the crayfish which is one of the favorite foods of certain fishes.

The portion which propels the lure backwards is variable depending on the type of material used and the shape desired. It can be in the form of legs, tails, fins, bellows or, generically, paddles. The major functional aspect is that it has sufficient elasticity and adequate surface area so that a paddle stoke pulls the lure backwards as the paddle returns to the original or resting position. This purpose is contrary to the purpose of prior patents whose tails or movable portions are designed to twist and move through the water to attract or confuse the fish or hide a visible hook and not to move the entire lure.

One improvement over the prior art in this invention is that it moves backward in the manner of a crawfish and the entire lure moves contrary to the direction of the fishing line.

A further improvement is that the lure moves contrary to the direction of the reel and line and hence towards a trailing fish in order to attract or incite the fish into attacking the lure.

Another improvement is to provide a fishing lure which resembles various fish baits in shape and or movement.

These and other improvements shall become clear from the detailed description of the preferred embodiment which follows. The following description should be considered in connection with the drawings in which a preferred embodiment of the invention is illustrated by way of example. It is expressly understood, that the drawings and description are for the purpose of illustration and description only, and are not intended as a definition of the limits of the invention.

References Cited in the file of this patent

| U.S. PAT. NO. | ISSUED TO | DATE ISSUED |
|---|---|---|
| UNITED STATES UTILITY PATENTS | | |
| 4,619,069 | STRICKLAND | OCTOBER 28, 1986 |
| 4,141,170 | FOSHER | FEBRUARY 27, 1979 |
| 3,861,073 | THOMASSIN | JANUARY 21, 1975 |
| 3,349,513 | JEFF | OCTOBER 31, 1967 |
| 3,158,952 | CREME | DECEMBER 1, 1964 |
| 3,100,360 | CREME | AUGUST 13, 1963 |
| 2,515,018 | PARNELL | JULY 11, 1950 |
| UNITED STATES DESIGN PATENTS | | |
| 281,806 | GREER | DECEMBER 17, 1985 |
| 222,058 | MEADORS | SEPTEMBER 28, 1971 |
| 239,281 | WILLIAMS | MARCH 23, 1976 |
| 98,644 | BURGE | FEBRUARY 18, 1936 |
| 220,829 | SABOL | JUNE 1, 1971 |

BRIEF DESCRIPTION OF THE DRAWINGS

FIG. 1 is a plan view of the preferred embodiment.

FIG. 2 is an overhead plan view of the preferred embodiment as the lure sits at rest.

FIG. 3 is an overhead view of the lure shown in FIG. 2 as it is pulled forward through the water and shows the movement of the tail through the water.

FIG. 4 is a side view of the lure shown in FIG. 2 seen from the side angle.

FIG. 5 is a PLAN side view of an alternate embodiment showing the use of a single PADDLE with a widened rear tail portion.

FIG. 6 is a side view of the embodiment shown in FIG. 5 showing the movement of the tail as the lure is pulled through the water.

FIG. 7 is an overhead view of an alternate embodiment which exhibits a paddle BLADE portion.

DETAILED DESCRIPTION OF THE PREFERRED EXEMPLARY EMBODIMENTS

The preferred embodiment is best seen by reference to Figure 1. FIG. 1 shows a fishing lure comprising a body or head portion 1, two paddles 2, and an elastic connection or connection means 3 between the two paddles 2. The body 1 has a front end 4 and rear end 7. The elastic connection 3 is shown at the rear 7 of the body 1. The lure may have eyes 18 or other structural modifications to make the lure appear more lifelike.

The body 1, paddles 2 or other portions of the lure may be made of materials less dense than the water in which the lure 9 is used in order to give the lure various depth maintaining characteristics. In one embodiment a portion of the lure would remain above the water at all times. In this embodiment, the lure would be designed so that at least one of the paddles 2 remained below the water level at all times in order to give the lure 9 the desired rear movement discussed in more detail below.

Refering to FIG. 7, the number and location of the paddles 2 anywhere along the body 1 may be varied and would still provide the same function.

Refering back to FIG. 1, the elastic connection 3 in the preferred embodiment holds the paddles 2 loosely and essentially parallel to the body 1 when the lure is at rest.

Referring to FIG. 3, the fishing line, shown as 12 in FIG. 2, is a leading line 12A, when the line 12 is being reeled in. Refering to FIG. 4, the fishing line is a trailing line 12B when the tension on the 12 line is released.

Hatched lines 15 in FIG. 3 show the direction of travel of the paddles 2 as the lure is pulled through the water. Hatched lines 16 in FIG. 4 show the direction of travel of the tail portion when the paddle is released. In this way, it is seen that the paddles are designed to maintain a more or less constant face against the pull of the water as the lure is pulled forward as shown in FIG. 3. Similarly, the paddles 2 roughly maintain their shape as they move back to their original postion shown in full lines on FIG. 4. By maintaining this shape, the paddles act to push water from the back 7 to the front of the lure 9 propelling the lure backwards. Weedless hook 19 may be inserted through the body 1.

In the preferred embodiment, the entire lure 9 is molded from a single plastic or fiberglass mold. The elasticity is controlled by a combination of thickness 8 and width 11 of the connection 3 of the lure 9.

The elastic connection 3 provided in the preferred embodiment uses plastic. It could similarly use rubber, elastic metal, springs or any similar means of providing sufficient elasticity to the paddles 2 to pull the lure 9 backwards when tension on the line 12 is released.

Although the preferred embodiment uses plastic construction throughout, the same concept embodied invention may be accomplished where only the elastic portion or means for connecting 3 is elastic. In this way, numerous different materials may be used for the body 1 and paddle 2. As an example, the body 1 and paddles 2 may be reflective metal, wood or hard plastic and only the elastic connection 3 need be elastic or made of elastic material. The plastic may also be reinforced for greater elasticity in the connecting portion 3 or for greater rigidity in the body 1 or paddles 2. This reinforcement may be accomplished by the insertion of reinforcing wires or the addition of additional layers of material with the appropriate characteristics to the outside of lure 9.

Similarly, elastic bands, as with rubber bands, may run from the front of the lure 4 to the paddles 2. In this way, the connecting means 3 need not be elastic at all, and instead the bands would provide the necessary elasticity. All of these modifications being within the scope of the patentable idea.

The shape of the paddle 2 may be varied in order to have greater reflective characteristics, or greater resistance to the water. FIG. 5 shows the use of a single paddle 2 as opposed to multiple paddles 2. This shape most closely resembles the appearance of a crawfish. This drawing also shows the use of a paddle blade 13 which is wider than the connection 3 in order to allow the blade 13 to be shorter and generally of a different shape. FIG. 5 shows the lure as it moves forward in the water. Firgure 6 shows the blade of the lure 14, in solid line, that it has at rest. The dotted lines 17 show the movement of the tail.

The tail in FIG. 5 shows the use of a widened portion 13 in the paddles 3 which serves to increase the resistance of the paddle 2 to the water as the lure 9 is pulled forward and also increases the push backwards of the lure when tension on the fishing line 12 is released.

Another improvement envisioned is the placement of a streamlined rear portion 14 which facilitates the rearward movement of the lure 9.

In the preferred embodiment, the connecting portion 3 is at the rear of the lure 9. FIG. 7 shows how, alternatively, this may be placed at the sides 5 of the lure, particularly where a trailing hook is desired.

Similarly, as shown in FIG. 7, the paddles 2 may be placed in more than one position along lure body and have variable resistances to the pull of the water.

The rear tails 6 of FIG. 7 indicate that the precise design of the paddles 2 may vary without effecting the efficiency or novelty of the lure so long as the underlying concept of having a paddle 2 elastically held with a face towards the flow of the water is maintained. Similarly, the rear tails 6 show that the elasticity may be spread throughout the paddle as opposed to being centralized in one connection 3. Basically, this amounts to providing an infinite number of continuous paddles connected by an infinite number of elastic connection, each attached to other over a finite length of paddle.

The paddle and connecting means may be combined to make a single flexible tail portion of umbrella or disc shape without departing from the inventive concept. This disc is bent out of shape as the lure is pulled forward and as it resumes its shape, pulls the lure back.

The method for using the lure requires that the fishing line to the lure be tensioned and released. This is accomplished by reeling in the line to which the lure is attached. To get tension on the line, pulling sharply on the line 12, as by pulling the fishing rod or rod (not shown) up; then lowering the rod to release the tension to give the lure 9 the appropriate action. When the rod is pulled up, the lure 9 is pulled forward through the water with sufficient speed so that any paddles 2 move back against the flow of the water. When the rod is lowered, releasing the tension on the line 12, the paddles 2 are pulled to their resting position along side the main body pulling the lure 9 and trailing line 12(b) back. If a fish is watching the lure 9, it appears to move backwards with the motion of a crawfish. If a fish is trailing the lure 9, the lure 9 moves back towards the fish on its own motion.

As can easily be seen from these examples, the number of paddles 2 and their placement can be changed in an infinite variety without departing from the inventive concept. Multiple connections may exist for a single paddle 2 without departing from the scope of the patent. The connections 3 may be made of elastic material in combination with connecting material. Multiple bodies 1 and paddles 2 on a single line 12 or series of lines 12 may be used to provide the appearance of a school of bait.

One suitable material for construction connection material of sufficient resilience is M-F WORM PLASTIC FROM M-F MANUFACTURING COMPANY (TM OF M-F MANUFACTURING COMPANY, INC.) P.O. BOX 18442 FT WORTH, TEX. 76118.).

A suitable lure 1 embodying the patentable aspects may be constructed using a body 1 of streamlined shape having a cylindrical shape of diameter of approximately ¼ inch. The height 11 of the paddle 2 is equal to the diameter 11 of the body 1 and has a width of 1/16 inch and larger. The paddle 2 curves forward to be approximately parallel to the body 1. The curved portion 3 of a paddle 2 provides sufficient elasticity and the paddle 2 provides sufficient resiliency to pull the lure 1 backwards.

The placement of hooks is generally discretionary. Typically, the hook is connected to the fishing line 12 and the lure 9 attached to the hook as other bait is attached. Typically, the hook is attached to the line at the front 4 of the lure 9 so that the lure will maintain the correct position relative to the water flow. Alternatively, the line 12 may pass through the body 1 of lure 9 and the hook may trail, undisguised or disguised using methods known in the art.

While a full and detailed description of the invention is set out, it should be understood that the invention is not limited in scope to the embodiments set forth herein. Accordingly, modifications of the invention may be resorted to without departing from the spirit hereof or the scope of the claims.

I claim:

1. A fishing lure comprising:
   (a) a body having at least one appendage including a paddle;
   (b) at least one elastic connection between said body and paddle having length and width with elastic memory to the contracted position attached at one end to the body wherein the elastic connection has elastic memory along the height and width of the said elastic connection to prevent twisting of the paddle when the elastic connection unbends along its length;
   (c) said paddle being attached to the elastic connection at the end opposite the connection with the body and having a face, the face shaped so as to resist the flow of water as the lure moves through the water so that the paddle face tends to move to and from the contracted position without twisting.

2. The fishing lure of claim 1 wherein the paddle is elastic.

3. The fishing lure of claim 2 wherein the height of the paddle is greater than the width of the paddle to discourage twisting.

4. The lure of claim 1 wherein the face is flat.

5. The lure of claim 1 wherein the face is curved inward along the length thereof thereby collecting water as it moves within the fold caused by the curved face.

6. The fishing lure of claim 1 wherein the elastic connection is higher than the elastic connection is wide so as to resist twisting.

7. The fishing lure of claim 1 wherein the face of the paddle is of substantially uniform height throughout to prevent water from passing through areas of lesser height in the paddle face.

8. The fishing lure of claim 1 wherein the elastic connection is of height at least equal to the paddle.

9. The fishing lure of claim 1 wherein the paddle curves outward and away from the body at the end of the paddle furthest from the elastic connection when at rest.

10. A fishing lure comprising:
    (a) a body having at least one appendage including a paddle;
    (b) at least one elastic connection between the body and paddle with elastic memory to the contracted position, the elastic connection being higher than it is wide so as to resist twisting and attached at one end to the body wherein the elastic connection has elastic memory along the height and width of the elastic connection to prevent twisting of the paddle when the elastic connection unwinds along its length;
    (c) said paddle being attached to the elastic connection at the end opposite the connection with the body having a face of substantially uniform height throughout to prevent water from passing through areas of lesser height in the paddle face and the height of the paddle being greater than the width of the paddle so that the paddle face tends to move to and from the contracted position without twisting.

11. The lure of claim 10 wherein the face is flat so as to resist the flow of water as the lure moves through the water.

12. The lure of claim 1 wherein the face is curved inward along the length thereof thereby collecting water as it moves within the fold caused by the curved face.

13. The fishing lure of claim 10 wherein the elastic connection is of height at least equal to the paddle.

14. The fishing lure of claim 10 wherein the paddle curves outward and away from the body at the end of the paddle furtherest from the elastic connection.

15. The fishing lure of claim 10 wherein there are two elastic connections, each mounted with a paddle attached on opposite sides of the body.

* * * * *